Jan. 23, 1968 J. W. MERRILL 3,365,241
SHIPPING VESSEL

Filed May 6, 1965 4 Sheets-Sheet 2

INVENTOR
JOHN W. MERRILL
BY
ATTORNEY

Jan. 23, 1968        J. W. MERRILL        3,365,241

SHIPPING VESSEL

Filed May 6, 1965        4 Sheets-Sheet 3

Fig. 5

INVENTOR
JOHN W. MERRILL
BY
ATTORNEY

Jan. 23, 1968    J. W. MERRILL    3,365,241
SHIPPING VESSEL

Filed May 6, 1965    4 Sheets-Sheet 4

INVENTOR
JOHN W. MERRILL
BY John F. Hohmann
ATTORNEY

United States Patent Office 3,365,241
Patented Jan. 23, 1968

3,365,241
SHIPPING VESSEL
John W. Merrill, Dunellen, N.J., assignor to Union Carbide Corporation, a corporation of New York
Filed May 6, 1965, Ser. No. 453,696
19 Claims. (Cl. 302—53)

The present invention relates to a vessel for transporting bulk granular and pulverized materials. More particularly, the present invention relates to a vessel which is capable, when filled, of being transported from one place to another by means of conventional transportation media without disturbing the contents of said vessel. Even more particularly, the present invention relates to a vessel for transporting bulk granular and pulverized materials which vessel has means for continuously discharging the entire contents of said vessel.

Heretofore, the vessels employed for transporting materials have been generally constructed such that their load volume is relatively small in relation to the weight of the vessel, or have been designed for transporting general bulk cargo which could reach weights of as much as 150 pounds per cubic foot of vessel volume.

In those instances where vessels have been designed to be transported by commercially available tractor and trailer combinations, the entire combination often exhibited an over-all weight which was several thousand pounds more than that which is required to transport cargo having a weight-to-volume ratio of only 20 to 40 pounds per cubic foot of vessel volume. Additionally, since there are gross weight maximum limits on all major interstate highways in the United States, this unnecessary weight in commercially available equipment is reflected in a cargo weight which cannot be transported and results, therefore, in a substantial loss of cargo which would otherwise be capable of being transported.

Where tractor and trailer combinations are employed in transporting cargo in vessels, the principal economic factors involved in determining the transportion costs per trip are directly related to the nature of the equipment employed and the time it takes a driver to transport the load rather than the weight of the cargo transported.

A further limitation which commercially available equipment exhibits is the rate at which the contents are discharged from the vessel. While vessels have been employed utilizing various combinations of internally mounted flexible diaphragms and means for aerating and fluidizing granular or pulverized, powdery materials within the vessel for discharging the contents under air pressure, these commercially available vessels have, generally, not been entirely satisfactory. For example, these commercial vessels are still not capable of completely discharging their contents, or preventing the granular or powdery material from packing on the vessel walls or from clogging the discharge lines. Even where air pressure has been employed for discharging vessel contents, such means have usually been designed to function together with the force of gravity. Quite often, additonal manpower is required to manually complete the unloading of the vessel.

It is an object of this invention, therefore, to provide a vessel capable of containing bulk granular material, which vessel can be transported in combination with or by tractor and trailer truck equipment, flat-bed rail car or barge.

Another object is to provide a vessel which, when completely loaded with bulk granular material, will fall within the maximum limits of gross weight, length, width and height, established on major interstate highways in the United States.

A further object is to provide a vessel which has a maximum weight-to-volume ratio for containing bulk granular material.

A still further object is to provide a vessel capable of withstanding a pneumatic pressure of 15 p.s.i.g. when discharging bulk granular material.

Still a further object is to provide a vessel having integral therewith a discharge means capable of continuously discharging the entire contents of said vessel.

These and further objects of the present invention are generally accomplished by providing a metallic, cylindrical vessel having a conveying means integral therewith through which bulk granular and/or pulverized powdery materials are discharged from said vessel; means for supporting a plurality of valve assemblies beneath said conveying means such that they are capable of coacting with spaced-apart openings in the conveying means; a flexible air conduit positioned below said support means; means for selectively inflating and deflating sections of the air conduit; inflatable diaphragms secured to the walls inside said vessel; and means for supplying air, under pressure, to the interior body of said vessel, to the conveying means and to the air conduit.

In one embodiment of the present invention, there is provided a vessel for transporting bulk granular material equipped with means for continuously and completely discharging the contents of said vessel; support means at each end of said vessel which permits the vessel to be stored off-the-ground and which support means is capable of elevating the vessel an amount sufficient to facilitate loading and unloading of said vessel from commercially available over-the-road transportation equipment; and means for stacking said vessels vertically upon each other in piggy-back fashion.

In a further embodiment of the present invention, there is provided a system for transporting bulk granular and/or powdery materials from one location to another utilizing a variety of different transportation media without direct handling of the bulk granular and/or powdery materials which comprises, means for containing the bulk granular and/or powdery materials in a vessel which vessel is equipped with means for accepting said materials and with means for continuously and completely discharging said materials from said vessel; means for storing said vessel off-the-ground; means for elevating said vessel enabling said vessel to be transferred to or from commercially available over-the-road transporting equipment; means for stacking said vessels vertically upon each other for transfer to and from barges; and means for placing at least two of said vessels end-to-end for transfer to and from commercially available, standard-sized, flat-bed rail car equipment; said vessel, loading means, discharge means, and contents, when in combination with each other, being within the maximum limits of gross weight, length, width, and height for transfer over-the-road on major interstate highways in the United States.

The materials which can be transported by, contained in, and be completely and continuously discharged from the vessel of the present invention are, generally, bulk granular materials having a particle size of between about 200 mesh to ⅜″ diameter, such as pelleted synthetic polymer resins, corn niblets, wheat kernels, sugar, sand, gravel, and the like. While it is also possible to transport, contain and discharge pulverized powdery materials having a particle size of less than about 200 mesh, such as powdered sugar, flour, cement, mortar, and the like, the vessel of the present invention is intended, primarily, for handling bulk granular material having a particle size as set forth hereinabove.

In order to provide a vessel which, when filled with bulk granular material, will meet the maximum limits of gross weight, length, height, and width for over-the-road transport on the major interstate highways in the United States, it has been found that a cylindrical, metallic vessel equipped with dished heads at each end is most suitable, the dished heads being convex in relation to the longitudinal axis of the vessel. A vessel of this shape and composition is preferred since, when filled with bulk granular material, it can be equipped with discharge means without exceeding the maximum over-the-road limits described hereinabove. Additionally, filled vessels of this type can be placed end-to-end and transported by standard sized flat-bed rail cars. Hence, the versatility of such a vessel permits it to be transferred from one location to another without disturbing or handling the contents contained therein. By utilizing the vessel of the present invention, bulk granular material can be speedily shipped from one point to another with a minimum of manpower resulting in substantial savings of time and handling costs. Since the vessel can also be stored at a factory site until ready for discharge, it can also result in a saving of inventory space for the ultimate user of the bulk granular material delivered. Over-the-road trucking time can also be reduced since a filled vessel can be delivered and an empty vessel picked up for return thereby reducing driver waiting time and truck standing time.

A cylindrical, metal vessel having convex dished heads at each end is preferred as the vessel of the present invention since this shape vessel can also act as a pressure vessel. The vessel can be constructed such that all the metal is in tension and can be designed so that the thickness of the metal employed can withstand a pressure of 15 p.s.i.g. while, simultaneously, providing the required thickness to obtain structural rigidity. Where required, or as desired, stiffening rings can be inserted at spaced intervals along the longitudinal axis of the vessel to provide circumferential stability thereto.

By providing a vessel capable of withstanding 15 p.s.i.g., the design requirements set forth under the "Unfired Pressure Vessel Code" are avoided as well as the required registration and inspection of such vessels. Furthermore, the pressure of 15 p.s.i.g. is equivalent to the maximum pressure of the most commonly used positive displacement rotary blowers. This is significant, since it enables commercially available pneumatic equipment to be used with the discharge means in the vessel of the present invention.

A vessel having these structural features and which is capable of being used in the versatile manner described hereinabove can be readily constructed from, for example, such metals as aluminum or stainless steel, and can be between about 35–40 feet in length and have an internal diameter of between about 7–8 feet. A vessel having these dimensions will be capable of containing a volume of between about 1200–1740 cubic feet. When fitted with loading means, discharge means, and stiffening rings, such a vessel will still be capable of being transported by commercially available over-the-road equipment and yet be within the maximum limits of the major interstate highways in the United States.

While a preferred form of the vessel of the present invention has been described as well as the manner in which it can be constructed, it should be understood that other materials can be similarly employed to produce vessels having different shapes. For example, rectangular, elliptical or oval shaped containers can be constructed from rigid or semi-rigid, self-supporting or non-self-supporting metal or plastic materials as may be desired.

Since, in its preferred form, the vessel of the present invention can be constructed to withstand a pressure of 15 p.s.i.g., it can be readily adapted to accommodate a pneumatic discharge means mounted integrally therewith for unloading the contents of said vessel.

A suitable discharge means for the vessel of the present invention can be comprised of, generally, a conveying member and valve members supported and activated by a flexible air conduit member all of which members cooperate with each other to discharge the fluidized contents of the vessel.

The various methods of discharging powdered and/or granular materials from containers by fluidizing the particles are well known to those skilled in the art. Hence, it is generally well known that for every particle size and shape of solid material, there is an air velocity at which the particle will "float" or become suspended in a stream of air moving in a vertical direction. When the air velocity is increased, that particle will move upward in the vertically-directed air stream. It becomes necessary, therefore, that, in order to convey many particles of a particular solid material through a conveying member, such as the conveying channel of the present invention, and, simultaneously, prevent some of the particles from dropping out of the air stream and settling on the bottom of the conveying channel, an air velocity several times greater than the velocity required to "float" the particles must be used. The air velocity required will vary with the different characteristics which the particles exhibit such as the size and shape of the particles and their specific gravity. For example, in a given system, or a system of a given length, an air velocity of about 4500 feet per minute could be required to transport pelleted polymer resins through a conveying channel.

It is also well known that conveying members, such as the conveying channel of the present invention, will offer resistance to the flow of air therethrough. At given air velocities, this resistance will increase and the increase will be directly proportional to the length and diameter of the conveying channel. Hence, the air pressure at the inlet end of the conveying channel must be increased as the length of the conveying channel increases in order to maintain a conveying air velocity therethrough. Since solid material is carried by the air passing through the conveying channel, the air pressure at the inlet end of the conveying channel must increase an even greater amount to insure that a conveying air velocity is maintained. As more and more solid material enters the air stream and is carried through the conveying channel, an increasing amount of air pressure will be required to retain an even flow of air through the conveying channel. For example, in a given system, or a system of given length, an air pressure of one pound at the inlet end of the conveying channel will create an air velocity of 5000 feet per minute therethrough when only air is flowing. However, if 1000 pounds per minute of granular material were introduced into the air stream, an air pressure of about 15 pounds would be required at the inlet end of the conveying channel to cause the granular material to flow therethrough. In the same system, if 500 pounds per minute of granular material were introduced into the air stream, the air pressure required at the inlet end of the conveying channel would be about 11 pounds to cause the granular material to flow therethrough.

The present invention will become more clear when considered together with the accompanying drawing which is intended to be merely illustrative thereof and wherein.

Figure 1:
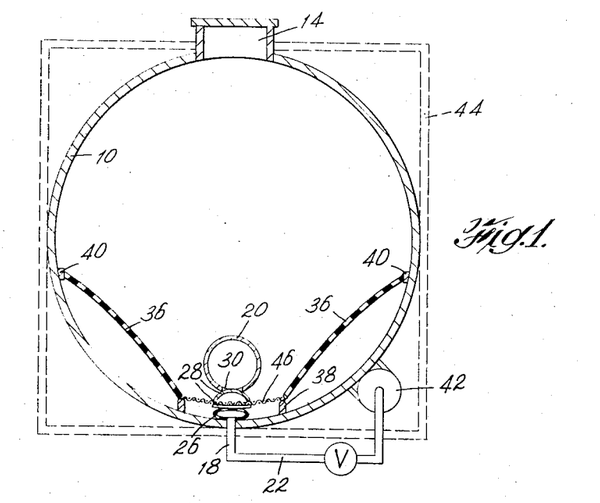
FIGURE 1 is an enlarged end elevational view, partly in section, illustrating one embodiment of the present invention.

Turning now to the drawing, wherein like reference numerals denote like parts, FIGURE 1 illustrates one embodiment of the present invention wherein the reference numeral 10 denotes a vessel having, along its upper, horizontal surface, a loading manhole 14, which leads into the interior of the vessel and provides the means by which the vessel can be inspected, cleaned, and loaded with bulk granular material. While several loading manholes can be provided, usually about two manholes are sufficient for this purpose.

A frame, such as 44, shown in phantom by the dotted lines, can be attached at each end of the vessel 10 to provide a means for stacking the vessels on top of each other and means for connecting detachable legs thereto for off-the-ground storage and/or facilitate loading and unloading of the vessel to and from tractor trailers as will be discussed in more detail hereinbelow.

A conveying channel 20 is located inside the vessel 10 along the lower horizontal surface of the vessel and runs substantially parallel to the longitudinal axis of the vessel. One end of the conveying channel 20 protrudes beyond one end wall of the vessel 10 and is equipped with an air connection means 21 (see FIGURE 5). The other end of the conveying channel protrudes beyond the other end wall of the vessel and is equipped to be connected to a discharge or unloading line (see FIGURE 5).

The conveying channel 20 is the means through which the bulk granular material flows when being discharged from the vessel 10 and is preferably comprised of a rigid, self-supporting metal and is circular in cross-section. However, the conveying channel 20 can also be of a rectangular, oval, or other desired cross-sectional configuration and can also consist of a material other than metal. In a preferred embodiment of this invention, a conveying channel comprised of a rigid, self-supporting, metal pipe having an inside diameter of between about 3″ to 6″, preferably, a 4″ inside diameter, is employed.

Since the point of deposit of the bulk granular material may, in one location, be 30 feet from the discharge end of the conveying channel and, in another location, may be 500 or more feet from the discharge end of the conveying channel 20, a means is provided to regulate the rate at which bulk granular material enters the conveying channel. This is accomplished by providing spaced-apart openings 30 in the bottom wall of the conveying channel 20. These spaced-apart openings, or slots, 30 should be sufficiently wide and long to prevent bridging of the granular material being carried upward and into the conveying channel by the air flowing through the conveying channel while, at the same time, insure that the upward flow of air is maintained at a velocity high enough to transport any particle among the variety of bulk granular materials which can be discharged. These openings, or slots, 30 are, preferably, elliptically shaped as shown in FIGURE 4a. However, it should be understood that the configuration of the slots 30 is not narrowly critical and that any other slot configuration, such as a rectangle, square, and so forth, can also be employed.

For optimum results in discharging the contents of the vessel 10, the slots 30 should be equidistant from each other, as measured from the center of one slot to the center of a next succeeding slot. Spaced-apart openings having a width of between about ½″ to 2″ and a length of between about 14″ to 18″ at intervals of between about 1″ to 3″ are suitable. In a preferred embodiment of the present invention and to obtain optimum results, the slots are about 1″ in width, 16″ in length and are spaced at intervals of about 2″ from each other as measured from the end of one slot to the beginning of the next succeeding slot.

A plurality of valve assemblies 28 are mounted below the conveying channel 20 and are positioned such that they cooperate with the slots 30 in the conveying channel 20 permitting them to be open or closed.

In a preferred embodiment of the present invention, the valve assemblies 28 comprises two metal members 28a and 28b which are bonded to an air permeable diaphragm 46, discussed in greater detail hereinbelow, which acts to support the valve assemblies but which does not activate or control them in any manner. The two pieces of metal comprising the valve assembly 28 are bonded opposite each other and on opposite surfaces of the air permeable diaphrgam 46 (see FIGURE 3). The lower metal valve member 28b, whose upper surface is bonded to the lower surface of the air-permeable diaphragm 46, acts as a rigid support for the upper metal valve member 28a as the valve assembly 28 is raised and lowered to cooperate with the slots 30. The lower surface of the upper metal valve member 28a is bonded to the upper surface of the air permeable diaphragm 46 and opposite the upper surface of the lower metal valve member 28b. The upper metal valve member 28a is positioned such that it will coact with a slot 30 adjacent its upper surface.

In order to insure that the valve assemblies 28 are firmly seated when raised into the slot openings 30 in the conveying channel 20, the upper surface of the valve member 28a can be shaped to conform to and cooperate with the configuration of the slot 30. One means by which this can be accomplished is to provide a valve member whose upper surface, in cross-section, is in the shape of an arc or the segment of a circle (see FIGURE 4). In this manner, intimate contact, assuring a substantially leak-proof seal, can be obtained between the upper surface of the valve member 28 with the walls defining the slots 30 in the conveying channel 20.

It should be understood that, while the valve assemblies 28 have been described as being comprised of two metal members, other rigid, self-supporting materials, such as wood, plastics, glass compositions, and the like, can also be employed and can also be of one piece construction. Where metal is preferred, the type of metal used is not narrowly critical but should be light-weight, rigid, self-supporting and non-corrosive, such as aluminum, stainless steel, and the like. Additionally, the valve assemblies 28 can also be comprised of single metal sheet shaped, in cross-section, into a cylindrical arc and attached directly to the upper surface of the air-permeable diaphragm 46.

The air-permeable diaphragm member 46 is positioned beneath the slots 30 in the conveying channel 20 and can be conveniently fabricated from materials such as canvas, cotton duck, and so forth, so that air under pressure can be supplied to its underside, and pass through it into the body of the vessel 10. When air under pressure is introduced beneath the air-permeable diaphrgam 46 in this manner and the air pressure introduced is slightly higher than that in the body of the vessel 10, fluidizing the bulk granular material in this area and causing it to flow through the slots 30 into the conveying channel 20 is thereby assured. For optimum results, the air-permeable diaphragm 46 should be at least as long as the length of the vessel 10 and be at least twice as wide as the conveying channel 20.

Figure 4:
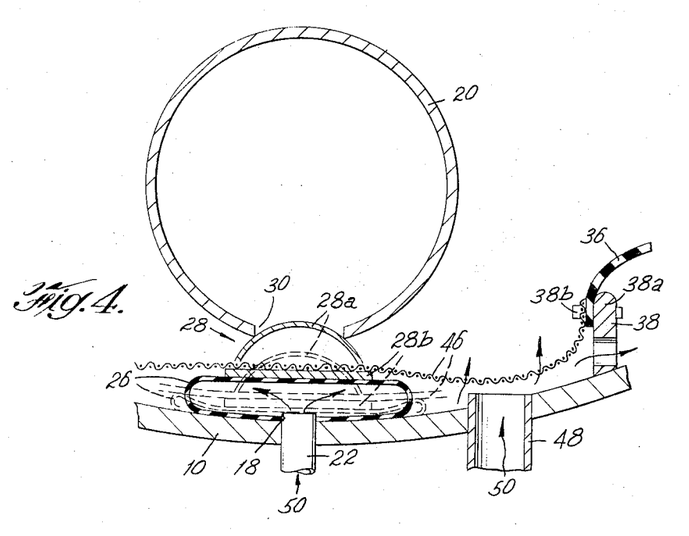
FIGURE 4 is a detailed end elevational view partly in section illustrating the engagement and disengagement of the valve assemblies with the slots in the conveying means.
Figure 4A:
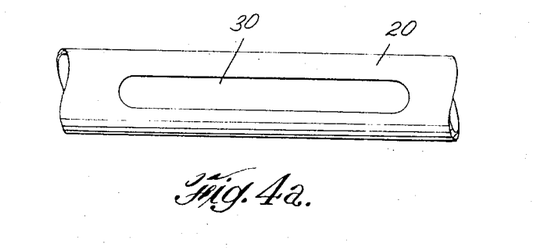
FIGURE 4a is a bottom plan view of the conveying means illustrating the configurations of the slots therein.

The sides of the air permeable diaphragm 46 can be secured to the lower portion of the walls of the vessel 10 by a suitable anchoring means 38, such as a support plate 38a and bolt 38b as shown in FIGURE 4.

Since the vessel of the present invention is designed to transport a great variety of bulk granular materials, it is possible that not all of these materials will be capable of being completely discharged through the conveying channel in the bottom of the vessel due to the angle of repose of some of the materials, such as pelleted polyethylene and polystyrene, or because of the densifying and packing tendencies of other materials, such as polyvinyl. Hence, in order to insure that the contents of the vessel, whatever they might be, are completely discharged, a pair of inflatable diaphragms 36 are mounted in the vessel 10. Suitable for such diaphragms are compositions such as rubber, rubber impregnated canvas, neoprene impregnated canvas and the like. The diaphrgams 36 are mounted in the vessel on each side of the conveying channel 20 and extend the entire length of the vessel 10.

One side edge of each of the inflatable diaphragms 36 is secured together with one side edge of the air permeable diaphragm 46 at the anchoring means 38 to obtain an air-tight seal therebetween. The other side edges of the inflatable diaphragms 36 are anchored along their respective lengths to the walls of the vessel 10 at 40. The inflatable diaphragms are equal in length to the length of the vessel 10 and should be sufficiently wide so that, when deflated, they lie flat against the walls of the vessel 10 thereunder. As the bulk granular material is pneumatically discharged from the vessel 10, air, under a pressure which is slightly higher than that in the body of the vessel 10, is introduced between the walls of the vessel 10 and the diaphragms 36 through the air-permeable diaphragm 46 causing the diaphragms 36 to expand or inflate. In this manner, the angle of repose of the bulk granular material can be altered and a trough-like effect created which helps guide the bulk granular material into the conveying channel 20.

Positioned below the air permeable diaphragm 46 and below the lower metal portion of the valve assemblies 28 is a flexible, inflatable, tubular air conduit 26. The air conduit 26 is equal in length to the length of the vessel 10 and is sealed at the discharge end of the vessel by, for example, sealing the walls of the tubular air conduit to each other or by bonding the ends of the tubular air conduit to the wall of the vessel 10 at its outlet end. The other end of the air conduit 26 is equipped with a connection means 18 for accepting air pressure from an outside source.

The air conduit 26 should be comprised of a material capable of being readily inflated or expanded under the influence of air pressure. Suitable for this purpose are such materials as rubber impregnated canvas, rubber impregnated cotton duck and the like. The air conduit 26 is held in place beneath the conveying channel 20 by, for example, clamping means 24 (see FIGURE 3), which are spaced at intervals of between about 16 inches to 20 inches apart forming sections along the length of the air conduit 26 which are slightly longer than the length of the slots 30.

Additionally, this clamping means 24 can also serve to support and fixedly secure the conveying channel 20 within the vessel 10. Air under pressure can be readily supplied to the air conduit 26 by means of a compressed air bottle 42 attached to the outer wall of the vessel 10 through an air line 22. After use, the compressed air tank 42 can be conveniently recharged from, for example, the compressed air brake tank of a commercial tractor trailer truck. Obviously, other means can also be employed to supply the required air under pressure to the air conduit 26.

When air under pressure is supplied to the air conduit 26, it becomes inflated causing the valve assemblies 28 mounted on the air-permeable diaphragm 46 to engage the slots 30 in the conveying channel 20. Since the air conduit 26 is divided into sections by the clamping means 24, opening and closing of specific slots 30 in the conveying channel 20 can be controlled as desired or required.

Figure 1A:
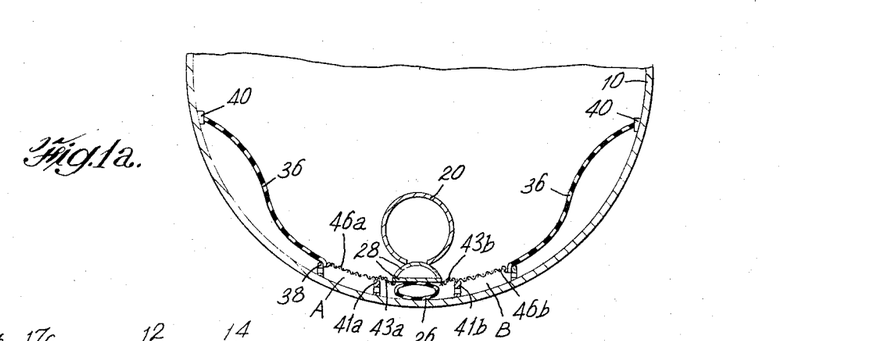
FIGURE 1a is an enlarged end elevational view, partly in section, illustrating another embodiment of the present invention.

FIGURE 1a illustrates another embodiment by which the discharge means of the present invention can be integrally mounted in the vessel 10. In this embodiment, the air-permeable diaphragm is comprised of two separate sections 46a and 46b which are of equal length and width. The air-permeable diaphragm sections 46a and 46b are positioned on opposite sides of the tubular air conduit 26. Each air-permeable diaphragm section 46a and 46b has one side edge secured to the lower portion of the walls of the vessel 10 by the anchoring means 38. The other side edge of each air-permeable diaphragm section 46a and 46b is secured to the top edges of vertically disposed metal plates 41a and 41b. The vertical plates 41a and 41b can be comprised of rigid, self-supporting, thin guage metal and be secured to the bottom wall of the vessel 10 by conventional means. Each vertical plate 41a and 41b is also as long as the length of the vessel 10. In this manner, two separate channels A and B are formed beneath the air-permeable diaphragm sections 46a and 46b on each side of the tubular air conduit 26 so that air under pressure can be introduced into each channel A and B either simultaneously or individually. The air under pressure being introduced into channels A and B can also be regulated so that the air pressure in one channel can be greater than the air pressure in the other channel and, in this manner, further facilitate the discharge of bulk granular materials from the vessel 10.

When two air-permeable diaphragm sections are thusly employed, the valve assemblies 28 can be mounted upon and bonded directly to the tubular air conduit 26. Additionally, to assure that some of the bulk granular material does not settle in the area beneath the tubular air conduit 26 and between the vertical plates 41a and 41b, flexible membranes 43a and 43b can be secured to the valve member 28 or the tubular air conduit 26 on one side and to the vertical plates 41a and 41b on the other side.

Figure 2:
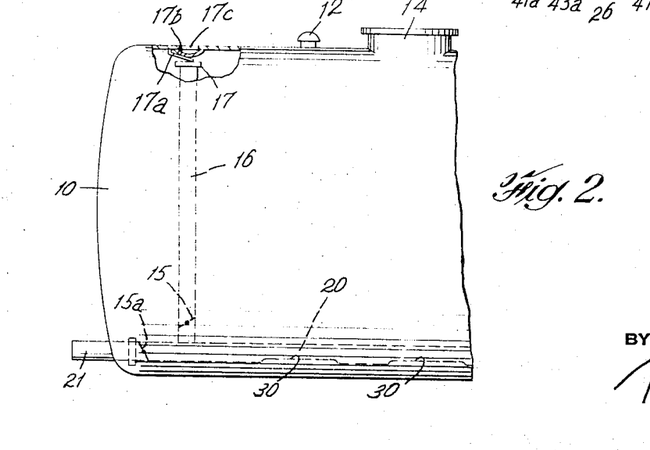
FIGURE 2 is a side elevational view, partly in section, of the apparatus of FIGURE 1.

In FIGURE 2 there is shown a rupture disc 12 on the upper side of the vessel 10. The rupture disc 12 is a conventional safety feature and is provided as an outlet for the gaseous contents of the vessel when the pressure inside the vessel threatens to exceed the safe pressure limits of the vessel walls. When this occurs, the excess pressure is relieved by rupture of the disc 12 rather than by rupture of the vessel walls.

In the interior of the vessel, shown in phantom by the dotted lines, is the conveying channel 20 and a vertically disposed air vent conduit 16 integrally connected to the conveying channel 20 near the inlet end of the vessel 10. The opening from the conveying channel 20 to the air vent conduit 16 can be restricted by means of dampers 15 and 15a. The air vent conduit 16 is equipped with a cap 17 at its upper end which is kept in place over the opening of the air vent conduit 16 by means of a light tension spring 17a to prevent bulk granular material from entering the air vent conduit 16 as the vessel is being filled and remains in place over the air vent conduit 16 when the air pressure within the vessel 10 is the same or lower than the air pressure outside the vessel.

Positioned above the top of the cap 17 is a diaphragm 17b. The diaphragm 17b is positioned below a vent means 17c which is common with the wall of the vessel 10 and which opens to the atmosphere outside the vessel.

As air under pressure flows into the vessel 10 through the air vent conduit 16 or through the air permeable diaphragm 46, the air pressure within the vessel increases. When the air pressure within the vessel 10 increases to between about 1 to 3 ps.i.g. greater than atmospheric pressure, this increased air pressure acts upon the diaphragm 17b forcing the diaphragm 17b against the vessel wall above it. At the same time, the tension spring 17a compresses permitting the cap 17 to rise, thereby opening this end of the air vent conduit 16 permitting air to flow therethrough from the upper portion of the vessel 10 into the conveying channel 20 through the damper 15. In the event that the air pressure within the vessel decreases to below about 1 to 3 p.s.i.g. over atmospheric pressure, the cap 17 will automatically be closed by the pressure of the tension spring 17a.

When the cap 17 is raised or in the open position, the flow of air from the upper portion of the vessel 10 downwardly through the air vent conduit 16 and into the conveying channel 20 can be readily controlled by opening or closing damper 15. Since the position of a valve assembly 28 relative to its corresponding slot 30 can also be simultaneously controlled, as described in greater detail hereinbelow, the amount of fluidized granular material entering the conveying channel 20 can be closely regulated. In this manner, the flow of bulk granular material through the conveying channel 20 can be prevented from becoming too dense.

It can be readily seen, therefore, that by employing the air vent conduit 16, a means is provided for permitting at least a portion of the fluidizing air, which has flowed upwardly through the bulk granular materials, in the vessel, to find its way back into the conveying channel 20.

Unless some means is provided for permitting the fluidizing air to escape from the vessel, fluidization of the bulk granular materials would not occur since there would be no upward flow of air. Without such means the air being introduced under pressure into the vessel 10 through the air permeable diaphragm 46 would enter the conveying channel 20 causing an extremely dense mixture of bulk granular material to enter the conveying channel 20. Under these circumstances, extremely high air pressures would then be required to move the bulk granular material through the conveying channel 20 and the operability of the discharge means would be exceeded. In this embodiment of the present invention, this difficulty is avoided by utilizing at least one, preferably two, of the air vent conduit means 16 described hereinabove. However, it should be understood that other means can also be employed to accomplish the same ends; such as, for example, providing a plurality of vents in the upper wall of the vessel 10 which can be set to open under the influence of a predetermined amount of pressure and through which the fluidizing air can escape into the atmosphere.

Figure 3:
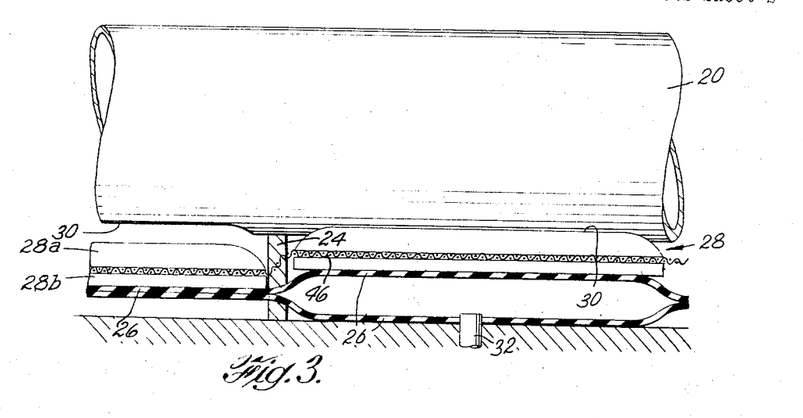
FIGURE 3 is a detailed and enlarged side elevational view of one embodiment of the discharge means within the vessel of the present invention.

In FIGURE 3 there is shown, in enlarged detail, the engagement and disengagement of the valve assemblies 28 in and out of the slots 30 when the flexible tubular air conduit 26 is inflated and deflated. The manner in which a three port T-plug cock 32, described in more detail hereinbelow, can be integrally bonded to cooperate with the tubular air conduit 26 is also illustrated.

Turning now to FIGURE 4, there is illustrated an enlarged end elevational view of the components comprising the discharge means of the present invention. Air line 22 supplies air, under a pressure of between about 70–80 p.s.i.g., to the air conduit 26 while the air passage 48 directs the flow of air, under a pressure of between about 2 to 15 p.s.i.g., into the body of the vessel 10, through the air permeable diaphgram 46 and between the walls of the vessel 10 and the walls of the inflatable diaphgrams 36. The direction of the flow of air into these areas is illustrated by the wavy arrows 50. If two air-permeable diaphragm sections are employed (FIGURE 1a), each channel formed, A and B, would have its own air passage similar to air passage 48.

When the air conduits 26 is inflated or expanded, it assumes the position indicated by the solid lines in FIGURE 4. The relative positions of the valve assemblies 28, and the air permeable diaphragm 46 are similarly illustrated under this condition.

When the air conduit 26 is deflated or exhausted of air, it, as well as the valve assemblies 28 and the air permeable diaphragm 46, assumes the position illustrated in phantom by the broken lines in FIGURE 4. These relative positions of the valve assemblies 28, air permeable diaphragm 46 and air conduit 26, with respect to the slots 30 in the conveying channel 20, illustrate the manner in which these components coact to seat and disengage the valve assemblies 28 in and out of the slots 30 in the conveying channel 20 thereby opening and closing these slots.

Figure 5:
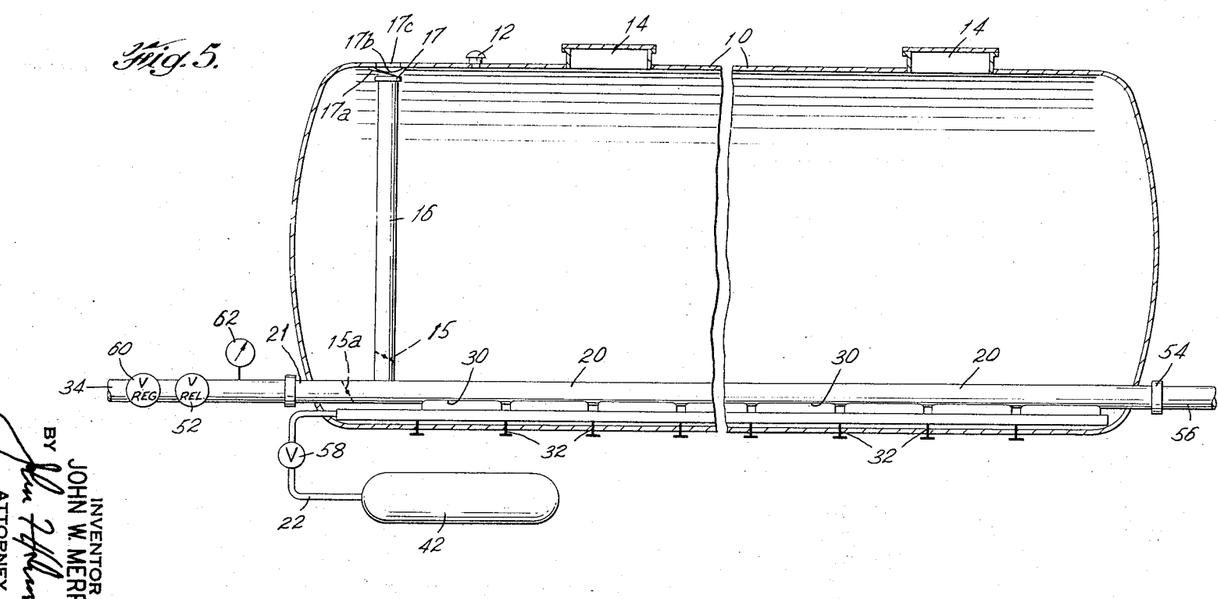
FIGURE 5 is a side elevational schematic view of the vessel of the present invention.

In FIGURE 5, there is shown a schematic illustration of the vessel 10 when connected and in position to discharge its contents.

At the discharge end of the conveying channel 20, a connection means 54 connects the conveying channel 20 to an unloading line 56 through which the bulk granular materials are delivered. The unloading line 56 can be adapted, for example, to deposit the bulk granular materials into hoppers for subsequent packaging in indusrial shipping bags, into storage bins or be directly connected to on-stream production facilities, as desired.

Air, under pressure, is supplied to the interior of the vessel 10, for example, by way of air passage 48 shown in FIGURE 4, and to the conveying channel 20 from an outside source, such as a positive displacement rotary blower, through means of an air connection line 34 as shown in FIGURE 5. A safety valve 52 can be provided in the event that the air pressure being introduced into the vessel 10 exceeds a predetermined amount.

The compressed air bottle or tank 42 is employed to feed air to the air conduit 26 (not shown) by means of air connection line 22. To further control the flow of air and air pressure in the air line system, a hand-operated valve 58 is incorporated in the air line 22 as is illustrated in FIGURE 5. In addition, a pressure regulator 60 and pressure gauge 62 can be utilized to further control and measure the air pressure being introduced into the vessel 10 and the conveying channel 20.

A plurality of three-port T-plug cocks 32 are mounted outside the vessel 10 between each valve assembly 28 and are positioned to coact with the air conduit 26. These plug cocks 32 cooperate with the walls of the tubular air conduit 26 and act to control the passage of air into and through the air conduit 26 as well as regulate the relative position of the valve assemblies 28 with their respective slots 30 in the conveying channel 20. Since they are three port plug cocks, the air flow can be controlled in two different directions. The plug cocks 32 can be controlled by means of, for example, a rotatable shank which extends beyond the walls of the vessel 10. The end of the rotatable shanks can be equipped with a suitable handle for turning the shank thereby opening or closing the T-ports in the plug cocks 32 in the manner desired such that air introduced under pressure into the air conduit 26 can be permitted to flow unimpeded, or be completely stopped, or exhausted to atmosphere.

Figure 6A:
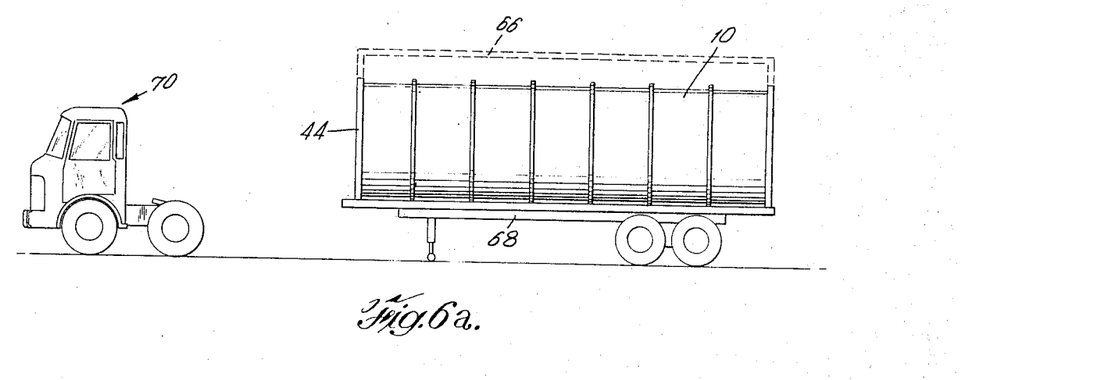
FIGURE 6a is an illustration of one means of transporting the vessel of the present invention.

One illustration of the versatility of the vessel of the present invention is depicted in FIGURE 6a where there is shown a vessel 10 on board a flat-bed truck trailer 68 which is in position for connection to a truck tractor 70. In this illustration, the support frame 44 for the vessel 10 is adapted to accommodate a stacking rack 66 shown in phantom by the dotted lines. By employing such a stacking rack 66, multiple units of vessels 10 can be vertically stacked for on-site storage, subsequent transportation by inland water barge, and so forth.

Figure 6B:
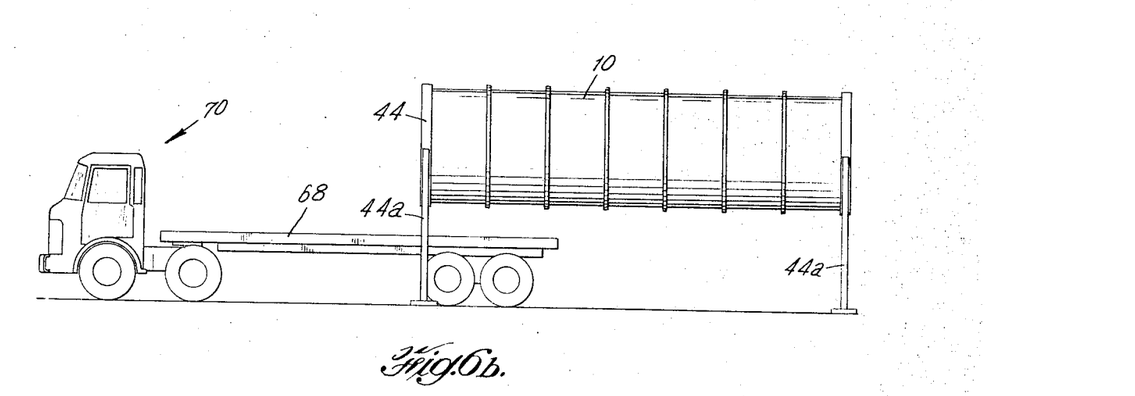
FIGURE 6b is an illustration of one means of loading, unloading and storing the vessel of the present invention.

A further illustration of the versatility of the vessel of the present invention is exemplified in FIGURE 6b which shows a truck tractor 70 and flat-bed truck trailer 68 in position to load a vessel 10. In this instance, the vessel 10 is supported by legs 44a and is sufficiently high off the ground to accommodate the flat-bed truck trailer 68 thereunder for loading or unloading the vessel 10. The legs 44a can be adapted to be secured to and removed from the frame 44 by means of connecting bolts and can be provided with jack means so that they can be raised or lowered off of or onto the flatbed truck trailer 68. Alternatively, the legs 44a can be of a fixed height and support the vessel 10 such that there is clearance between the bottom of the vessel 10 and the bed of the trailer 68. To facilitate loading and unloading of the vessel 10 from the flat-bed truck trailer under these conditions, the truck trailer 68 can be raised or lowered by means of jacks. Raising and lowering the truck trailer 68 is preferred since most truck tractors are now provided with such jack means as standard equipment for raising the front end of the trailer. The back end of the trailer can be similarly raised by means of jacks attached to the underside of the trailer deck. After being filled with bulk granular material at a factory site, the vessel 10 can, for example, be transported over-the-road by truck and left on the detachable legs 44a at a plant site or be vertically stacked in piggy-back fashion at a dockside for later shipment by inland water barge. After being unloaded from a barge at a port of distination, at least two vessels can be transferred to a standard sized flat-bed rail car and transported by rail for subsequent delivery by tractor and trailer to a user's plant site. The vessel 10 can then be stored there off the ground by utilizing the removable and detachable legs 44a until the bulk granular materials are ready to be discharged from the vessel 10.

With reference to FIGURES 1–5, particularly FIGURE 5, a typical operation for continuously and completely discharging bulk granular material from the vessel of the present invention will now be described in greater detail.

The vessel 10 can be conveniently filled through the loading manholes 14. Before the vessel 10 is filled with bulk granular material, all the slots 30 in the conveying channel 20 are closed and must remain closed until the vessel arrives at its destination and is ready to be unloaded. This is readily accomplished by inflating the air conduit 26 and engaging the valve assemblies 28 in the slots 30 of the conveying channel 20. The air conduit 26 is permitted to remain inflated during transport of the vessel 10.

After the filled vessel 10 has arrived at an unloading point and the bulk granular material is now desired to be discharged, the unloading line 56 is first connected to, for example, a storage bin or hopper. The connecting line 34 is then connected to an air supply source at one end and to the vessel 10 at the other end. At this point, the hand operated valve 58 is normally opened. The source of air supply such as an air compressor unit or positive displacement rotary blower is then started. When the conveying channel 20 has an inside diameter of about 4", the source of air should be capable of supplying about 450 cubic feet of air per minute at a pressure of between about 10–15 p.s.i.g.

After the air supply unit has been started and air under pressure has begun to flow into the space beneath the air permeable diaphragm 46, for example, by way of air passage 48 shown in FIGURE 4, the air will pass through the air permeable diaphragm 46 and flow upwardly through the bulk granular material into the body of the vessel 10. The air pressure in the vessel 10 will rapidly increase and this pressure, acting on the diaphragm 17b will cause the diaphragm 17b to rise and permit the cap 17 to be lifted from the end of the air vent conduit 16 by compressing the tension spring 17a. At this time, air will then be flowing into the vessel 10, through the air permeable diaphragm 46, through the bulk granular material in the vessel, downwardly through the air vent conduit 16, into the conveying channel 20, and through the discharge line 56. The pressure of this flow of air will, at this time, be reflected on the air pressure gauge 62.

When the air pressure becomes constant, as indicated by the pressure gauge 62, the first unloading slot 30, that is, the slot nearest the air inlet end of the vessel 10, is opened. This first slot is opened when the valve assembly 28, firmly seated therein, is disengaged therefrom by opening the first plug cock coacting with that section of the air conduit 26 located nearest the inlet end of the vessel 10. That section of the air conduit 26 is then collapsed by exhausting the air in that section to atmospheric pressure. The weight of the bulk granular material in the vessel together with the air pressure in the vessel 10 compresses this section of the tubular air conduit 26 thereby causing this first slot to become opened. Usually, no increase in pressure; that is, no differential in pressure between the air in the main body of the vessel 10 and the air in the conveying channel 20, will be registered on the air pressure gauge 62 so that no bulk granular material is carried upwardly into the conveying channel 20 at this time.

The damper 15a is then gradually closed causing the air pressure in the main body of the vessel 10 to increase over that in the conveying channel 20 until the desired pressure is indicated on pressure gauge 62. At this time, air begins to flow upward through the opened slot, carrying the bulk granular material with it, and begins to mix with the air being admitted into the conveying channel 20 by hand operated valve 60 or the damper 15a which can be employed individually or in conjunction with each other. As the air pressure in the body of the vessel 10 continues to increase over that in the conveying channel 20, more bulk granular material is carried into the conveying channel 20 until the maximum rate of discharge is reached.

In addition to utilizing hand valve 60 and/or the damper 15a, the plug cocks 32 can also be employed to help regulate the flow of bulk granular material through the conveying channel 20 by controlling the degree to which the tubular air conduit 26 is inflated.

The maximum rate of flow of the bulk granular material occurs when the pressure within the conveying channel 20 is about ½ p.s.i.g. below that which can be produced in the vessel 10 by the air-compressor unit employed but in no event greater than 14½ p.s.i.g. below such pressure.

When the pressure in the conveying channel 20 drops, as indicated by pressure gauge 62, all the bulk granular material that will flow into the opened slot has been discharged and the next succeeding slot 30 is then opened in the same manner as described hereinabove. The slot first opened is then closed by opening the plug cock 32 permitting the air conduit 26 to become inflated, thereby raising the valve member 28 until it is again firmly seated in the first slot.

The same procedure of sequentially opening each next succeeding slot and closing each preceding slot is followed until all the bulk granular material has been discharged from the vessel.

When the bulk granular material first begins to be discharged from the vessel 10, the air pressure in the main body of the vessel 10 together with the weight of the bulk granular material acts to keep the inflatable diaphragms 36 against the walls of the vessel 10. But as the level of the bulk granular material in the vessel falls, the air pressure between the inflatable diaphragms 36 and the walls of the vessel 10, being greater than the air pressure in the body of the vessel 10, causes the inflatable diaphragms 36 to expand and assume a semi-cylindrical shape. In this manner, a steeper angle of repose, or trough-like effect, is created, as pointed out hereinabove, along which the bulk granular material is caused to flow more readily thereby assuring that the entire contents of the vessel are discharged.

Although the vessel of the present invention has been described as handling and conveying only one bulk granular material at one given time, it should be understood that the vessel can also be compartmented in order to transport two or more different types of bulk granular materials. The bulk granular material in one compartment can be readily discharged before discharging the bulk granular material in another compartment through the same conveying channel by proper control of the plug cocks. Alternatively, individual conveying channels with appropriate discharge elements can be provided for each compartment and the various bulk granular materials discharged therefrom either consecutively or simultaneously.

Hence, while the present invention has been described in some detail and with particularity, it should be under-

What is claimed is:

1. An apparatus for containing and transporting bulk granular materials which comprises, in combination:
   (a) a vessel;
   (b) a conveying means positioned near the bottom of and within said vessel the length of which is substantially parallel to the longitudinal axis of said vessel and which has a plurality of spaced openings along one side;
   (c) an air permeable diaphragm member positioned between said conveying means and the bottom of said vessel;
   (d) a plurality of valve assemblies mounted on said air permeable diaphragm member which are positioned to coact with the spaced openings in said conveying means;
   (e) a flexible air conduit member positioned between said air permeable diaphragm member and the bottom wall of said vessel;
   (f) means for inflating and deflating said flexible air conduit member;
   (g) means for passing air under pressure through said air permeable diaphragm member into the body of said vessel;
   (h) means for increasing and decreasing the air pressure within said vessel; and
   (i) means for venting to the atmosphere the air under pressure flowing in said vessel.

2. An apparatus for containing and transporting bulk granular materials which comprises, in combination:
   (a) a cylindrical vessel;
   (b) a channel within said vessel for conveying bulk granular materials, the length of said channel being substantially parallel to and equal in length to the longitudinal axis of said vessel when said vessel is in a substantially horizontal position, said channel having a plurality of spaced-apart openings in and along its lower wall surface;
   (c) a flexible, air permeable diaphragm positioned between the bottom wall of said vessel and the lower wall surface of said channel;
   (d) a plurality of valve assemblies mounted on said air permeable diaphragm and positioned to coact with the spaced-apart openings in said channel;
   (e) a flexible, tubular air conduit positioned between said air permeable diaphragm and the lower wall of said vessel;
   (f) means for passing air under pressure through said air permeable diaphragm into the body of said vessel;
   (g) means for inflating and deflating the flexible, tubular air conduit such that the valve assemblies enter into and are withdrawn from the spaced-apart openings in said channel;
   (h) means for increasing and decreasing the air pressure within said vessel relative to the air pressure in said channel; and
   (i) means for venting to the atmosphere air under pressure flowing through said vessel.

3. Apparatus of claim 2 wherein the channel within the vessel is a cylindrical tube having an inside diameter of between about 3 inches to 6 inches, one end of which is connected to a source of compressed air at one end of said vessel and the other end of which acts as a discharge opening for the bulk granular materials at the other end of said vessel.

4. Apparatus of claim 2 wherein the spaced-apart openings in said channel are a plurality of elliptically-shaped slots whose longitudinal axis is substantially parallel to the longitudinal axis of said channel and which are between about 14 inches to 18 inches in length and between about ½ inch to 2 inches in width.

5. Appartus of claim 2 wherein the tubular air conduit is divided into sections of between about 16 inches to 20 inches in length, each section of which contains at least one valve assembly.

6. Apparatus of claim 2 wherein the valve assemblies comprise a plurality of rigid, cylindrical, arc-shaped metal members adapted to substantially close the spaced-apart openings in said channel when said valve assemblies are seated in said openings.

7. Apparatus of claim 2 wherein the venting means is a plurality of vertically disposed air vent conduits connected to said channel within the body of said cylindrical vessel.

8. Apparatus of claim 2 wherein the flexible, air permeable diaphragm is comprised of two separate sections of equal length and width, each of said sections being positioned on opposite sides of said tubular air conduit.

9. Apparatus of claim 2 wherein the cylindrical vessel is between about 30 ft. to 40 ft. in length, has an inside diameter of between about 7 ft. to 8 ft. and has a volume of between about 1200 to 1740 cubic feet.

10. Apparatus of claim 2 wherein a pair of inflatable diaphragms is mounted on each side of the air permeable diaphragm, each of said inflatable diaphragms having one side edge thereof secured to an adjacent side wall of said vessel and the other side edge integrally secured to a respectively adjacent side edge of the air permeable diaphragm.

11. Apparatus of claim 3 wherein the cylindrical tube comprising the channel is comprised of a rigid-self-supporting metal.

12. Apparatus of claim 4 wherein the slots in said channel are equi-distant from each other.

13. Apparatus of claim 5 wherein the tubular air conduit is comprised of rubber-impregnated canvas.

14. Apparatus of claim 8 wherein the valve assemblies are supported by the tubular air conduit and the space between the separate air-permeable diaphragm sections and the tubular air conduit is covered with a protective membrane which prevents bulk granular material from settling therein.

15. Apparatus of claim 9 wherein the cylindrical vessel contains a plurality of individual compartments.

16. Apparatus of claim 15 wherein each compartment is provided with its own discharge means comprising, in combination, a channel, air permeable diaphragms, valve assemblies, tubular air conduits, and venting means.

17. Apparatus of claim 16 wherein the discharge means of each compartment is individually controlled and regulated.

18. Apparatus of claim 10 wherein the inflatable diaphragms are comprised of rubber.

19. Apparatus of claim 10 wherein means is provided for inflating and deflating the inflatable diaphragms such that, when inflated, a trough is created within said vessel through which the bulk granular materials are guided into said channel.

References Cited

UNITED STATES PATENTS

| | | | |
|---|---|---|---|
| 3,069,207 | 12/1962 | Borger et al. | 302—52 |
| 3,088,776 | 5/1963 | Aller | 302—52 |
| 3,099,497 | 7/1963 | Albert | 302—52 |
| 3,180,511 | 4/1965 | Huisman | 214—515 |
| 3,186,570 | 6/1965 | Bunnell | 214—515 |
| 3,202,461 | 8/1965 | Paton | 302—29 |

ANDRES H. NIELSEN, *Primary Examiner.*